Figure 1:
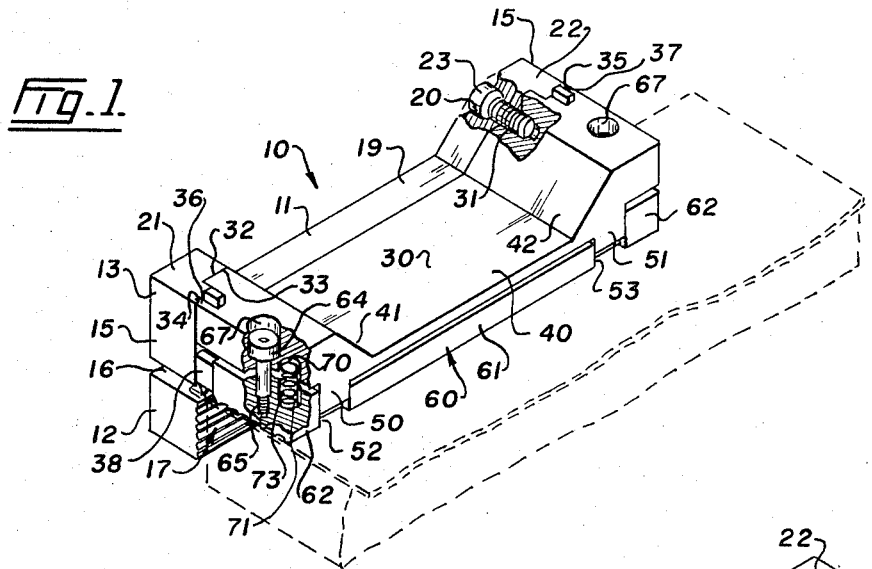

United States Patent [19]
Grueber

[11] 3,732,619
[45] May 15, 1973

[54] TOOL FOR TRIMMING LAMINATED PLASTIC SHEETS

[75] Inventor: Detlef Grueber, North Vancouver, British Columbia, Canada

[73] Assignee: Arlyn Industries Ltd., British Columbia, Canada

[22] Filed: June 1, 1971

[21] Appl. No.: 148,537

[52] U.S. Cl. ............................................. 30/287
[51] Int. Cl. .............................................. B26b 29/00
[58] Field of Search ...................... 30/289, 293, 286, 30/287, 294

[56] References Cited

UNITED STATES PATENTS

| 3,120,055 | 2/1964 | Baber | 30/289 X |
| 3,613,239 | 10/1971 | Porrelli | 30/293 |

Primary Examiner—Robert C. Riordon
Assistant Examiner—J. C. Peters
Attorney—Brian J. Wood

[57] ABSTRACT

A tool for trimming the overhanging edge of a sheet laid on an object, such as a counter, flush with a side edge of the article. The tool includes a reference surface adapted to move along the side surface, and a depressible surface substantially at right angles to the reference surface and adapted to ride on the surface of the sheet to be cut. At least one cutting tool is mounted in the device with its cutting edge positioned to cut into the sheet when the tool is depressed.

5 Claims, 8 Drawing Figures

INVENTOR
DETLEF GRUEBER
BY
Fetherstonhaugh & Co
ATTORNEYS

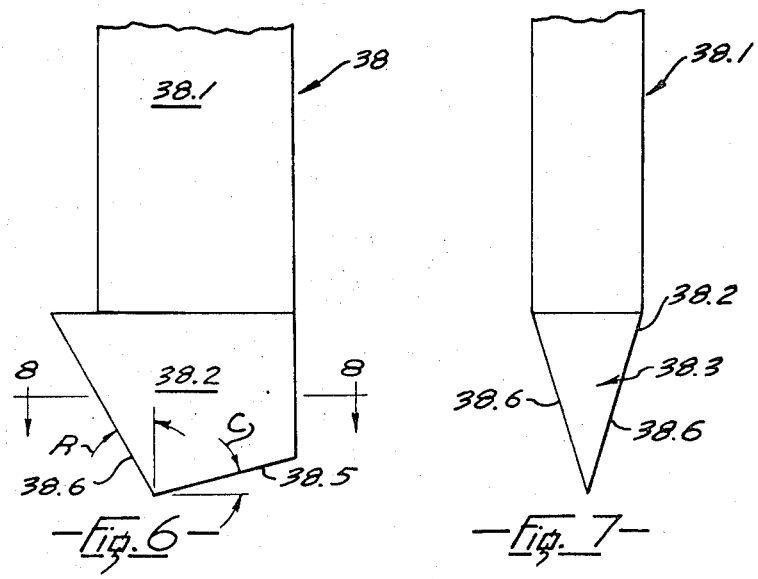
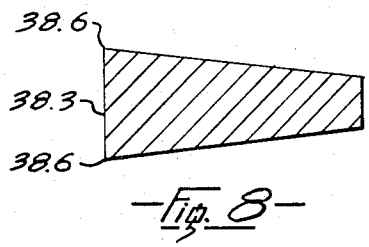

TOOL FOR TRIMMING LAMINATED PLASTIC SHEETS

This invention is concerned with a device for trimming the edges of laminated plastic sheets, such as for example formica, flush with an edge of a surface to which the sheet is applied.

It is common practice when covering a surface with a sheet of laminated plastic material to cement the sheet to the surface so that it overhangs the edge of the surface and subsequently to remove that overhang. One device for removing the overhang is illustrated in U.S. Pat. No. 3,120,055 issued Feb. 4, 1964 to Glenn L. Baber. It has a generally U-shaped body of which one limb carries a reference block and the other limb carries a scoring tool directed towards and in line with a reference surface of the block. In use the two limbs are placed one to each side of the overhanging material of the sheet and the block is butted against the edge of the surface which is covered by the sheet so that the scoring point of the tool rests on the upper surface of the sheet and as it is moved along that sheet so it makes a score in line with the edge against which the block is butted. When the upper surface of the sheet is scored it may be snapped off.

This invention seeks to provide a device which will cut the overhang flush with the edge of the surface to be covered and thus avoid any cracking or shelling of that edge and so render the further finishing such as filing of it unnecessary. The invention provides other advantages which will be apparent from the following description.

From one aspect of this invention there is provided a device for trimming laminated plastic sheets flush with an edge of a surface to which they are applied which comprises a body defining a reference surface, a cutting tool mounted on the body spaced from, directed towards and in the plane of, the reference surface so that the reference surface may be butted against the edge to which the laminated plastic sheet is required to be made flush, with the tool on the opposite side of the sheet. The tool extends along side of a movable platform which is engaged with the surface of the sheet in which the cut is to be made so that the tool projects below and so that the cut made by the tool can be made progressively deeper by reciprocating the device along the edge of the surface to be covered and progressively depressing the body.

Preferably there are two tools, one at each end of the device, so that the device may be used to cut into both right and left hand corners of an edge and each tool may have a separate platform associated with it so that one may be moved whilst the other is not. In this way the platform protects the non-cutting tool during a trimming operation. Alternatively there may be a single long platform common to both tools and arranged to be capable of adopting an inclined position relatively to the body of the device in this way to protect the non-cutting tool.

The reference surface is conveniently defined by two spaced-apart points located directly in line with the two tools so that the tool may be used to trim an edge which is convex as well as one which is concave or straight.

Figure 2:
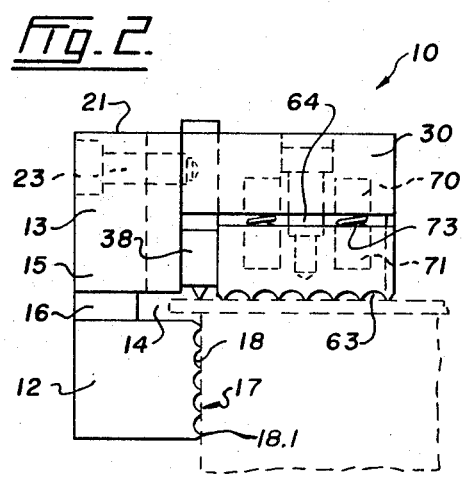
Figure 5:
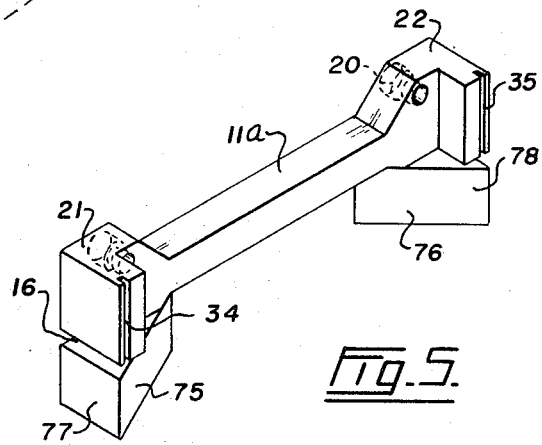
Figure 3:
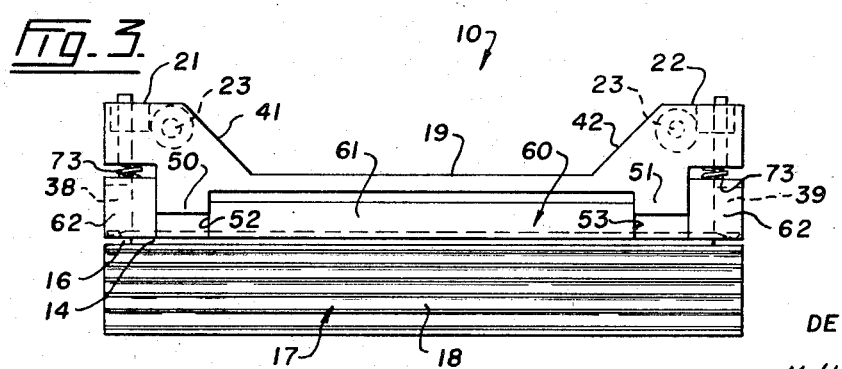
Figure 4:
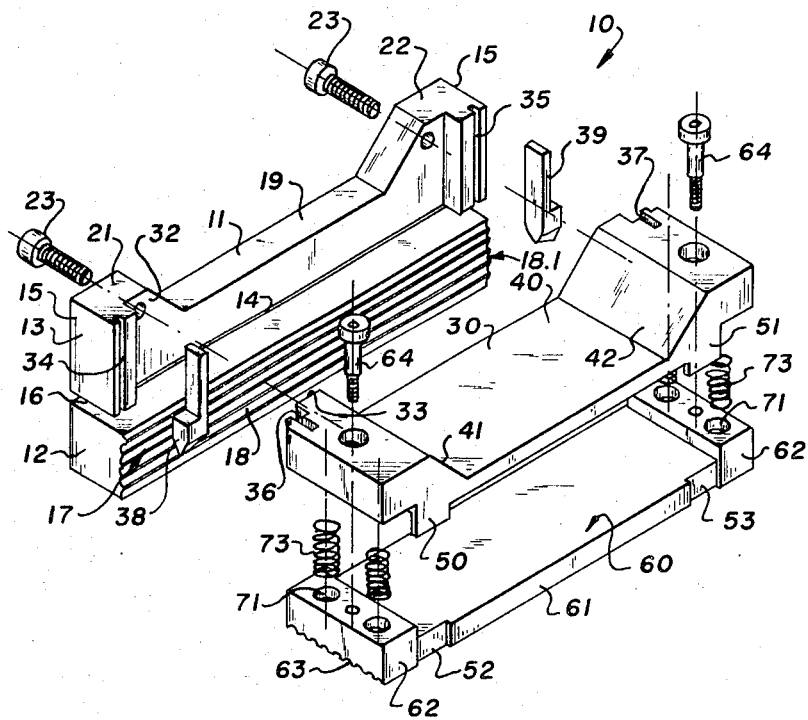

An embodiment of this invention is illustrated in the accompanying drawings in which, FIG. 1 is a perspective view of a tool according to this invention, FIG. 2 is an end view of the tool, FIG. 3 is a front view of this tool, FIG. 4 is an exploded view of the tool, and FIG. 5 shows an attachment for the tool of FIGS. 1 to 4.

FIGS. 6 and 7 are side and end elevations, respectively of a portion of a cutting tool, FIG. 8 is a section taken on line 8—8 of FIG. 6.

The device or tool comprises a body indicated at 10 and conveniently formed of a plastic material such as nylon. The body is of generally L-section of which the two limbs are separable. One limb of the L is constituted by the molding 11 which comprises a lower section 12 separated from an upper section 13 by a groove 14 formed longitudinally of the molding and opening inwardly therefrom and which, in use accommodates the overhang of the laminated plastic sheet material which is to be trimmed. Each end 15 of the molding has a groove 16 therein of similar depth to groove 14 and opening outwardly therefrom so that the device, as will be apparent from the following description, can be used to trim sheets right into internal corners of the edge of the surface.

The inner surface 17 of the lower section 12 of the molding forms one side of the interior corner of the L-section of the device and is formed with longitudinally extending grooves 18 so that the crests between the grooves constitute a reference surface 18.1 of the device.

The upper edge of the molding 11 is cut away as at 19 to form, as is described hereinafter, with a similar recess in the remaining part of the body, a hand grip.

Counterbored holes 20 are formed in the end portions 21 and 22 of the molding to accommodate screws 23 by which the molding 11 is secured to the other part of the body.

A second molding 30 forms the other limb of the L-shaped body and has threaded holes 31 formed in it to receive the screws 23 which secure the two moldings forming the body.

The butting faces 32 and 33 of the two moldings have opposed slots 34, 35 and 36, 37 therein for receiving the shanks of cutting tools 38 and 39 respectively therebetween.

The molding 30 is recessed as at 40 in similar fashion to the recess 19 of molding 11 so that a hand-grip is formed and faces 41 and 42 are provided as stops against which pressure may be exerted by an operator.

The front edge of the molding 30 is provided with downwardly extending and spaced apart guide strips 50 and 51 which engage in corresponding grooves 52 and 53 of a platform 60 positioned below and co-extensive with molding 30.

The platform 60 comprises a plate 61 with a thickened portion 62 at each end. The lower surface of the platform is formed with longitudinally extending grooves 63 therein. The platform is held to the molding 30 by means of socket screws 64 which are threaded into bores 65 formed in the thickened portions 62 of the platform, and the heads and shanks of the screws are slidable in countersunk bores 67 in the ends 15 of the molding 30. Located within aligned sockets 70 and 71 in the molding ends 15 an of the molding 30. Located within aligned sockets 70 and 71 in the molding ends 15 and raised portions 62 of the platform, respectively, are springs 73 which resiliently urge the molding and platform apart. The strips 50 and 51 engaging in the grooves 52 and 53 and the slidable fit of the screw 64 in the bore 67 guide the platform in its movement against and under the influence of the springs 73 and maintain the lower surface of the platform perpendicular to the reference surface 18.1.

To operate the device it is located on the work as can be seen in FIGS. 1 and 2 with the platform 60 on that surface of the sheet which is to be cut and with the reference surface 17 abutting the edge to which the overhang of the plastic sheet is to be made flush. The overhang of the sheet extends into groove 14 at this time, see FIG. 2. The tool is then worked along the edge with the reference surface 17 maintaining contact with the edge of the surface to be finished until a cut is made. The operator exerts downward pressure on the forward end of the device, with reference to the direction of movement thereof, so as to cause the cutting tool at that end to engage and cut the sheet, the cutting tool at the opposite end of the device being spaced above the sheet. At this time, it will be noted that the cutting edge of the tool is directly over the reference surface 17, see FIG. 2. Thus molding 30 can be rocked back and forth as the device is reciprocated on the plastic sheet to cause the desired cutting tool to cut the sheet. Alternatively it is possible to arrange to have two separate platforms one associated with each cutting tool to achieve the same end.

It will be appreciated that the embodiment illustrated in FIGS. 1 to 4 is one which effectively will trim sheets of laminated plastic overhanging straight or concave surfaces. When trimming concave surfaces, only the extreme ends of the reference surface 17 contact the edge of the surface to be trimmed. However it cannot effectively trim convexly curved surfaces. To effect trimming of convex surface it is proposed that the molding 11 be removed from the molding 30 by unfastening screws 23 and be replaced by the molding 11a illustrated in FIG. 5 which is largely similar to molding 11 but one in which the reference surface 17 is replaced by a reference surface constituted by the inclined edges 75 and 76 of the triangular blocks 77 and 78 respectively. The reference edges 75 and 76 ride over the curved surface during operation of tool 10. The operation of the tool as described relative to FIGS. 1 to 4.

Although it is preferable to make device 10 so that a cutting tool can be mounted at each end thereof, it will be understood that the device may have only one cutting tool associated therewith.

I claim:
1. A device for trimming a laminate plastic sheet flush with an edge of a surface covered by the sheet including:
   a. a body having an upper section and a lower section,
   b. the lower section being spaced from the upper section to provide a groove for accepting the overhang of the sheet to be trimmed and having an outer edge defining a reference surface for slidably engaging the edge of the surface covered by the sheet,
   c. a cutting tool mounted on the body in line with the reference surface and spaced above the lower section to clear the sheet when it is inserted in the groove extending across the groove a distance greater than the thickness of the sheet,
   d. a platform disposed on the body adjacent the cutting tool having a flat lower surface for slidably engaging the upper surface of the sheet to be cut, said lower surface being perpendicular to the reference surface,
   e. means for connecting the platform to the body for limited slidable movement between a non-cutting position in which the lower surface of the platform extends beyond the cutting tool and a cutting position in which the cutting tool extends beyond the lower surface of the platform a distance greater than the thickness of the sheet to be cut,
   f. resilient means mounted between the upper section of the body and the platform for yieldably urging the platform to the non-cutting position.

2. A device as claimed in claim 1 including two cutting tools mounted on the device at opposite ends of the reference surface so that the tool can cut in each of opposite directions in which the device is moved.

3. A device as claimed in claim 1 in which the cutting tool has a pair of four cutting edges having a negative rake of between 25° and 35° with reference to the direction movement of the device when the tool is cutting.

4. A device as claimed in claim 1 in which the said reference surface is defined by two edges spaced along the length of the tool to facilitate trimming of convexly curved edges.

5. A device as claimed in claim 1 in which the cutting tool has a V-shaped forward face and rearwardly tapered side surfaces merging with edges of said forward face so that said edges are cutting edges.

* * * * *